United States Patent [19]

Nishiya

[11] Patent Number: 4,825,393
[45] Date of Patent: Apr. 25, 1989

[54] POSITION MEASURING METHOD

[75] Inventor: Takushi Nishiya, Machida, Japan

[73] Assignee: Hitachi, Ltd., Tokyo, Japan

[21] Appl. No.: 41,228

[22] Filed: Apr. 22, 1987

[30] Foreign Application Priority Data

Apr. 23, 1986 [JP] Japan .................................. 61-92088
Apr. 23, 1986 [JP] Japan .................................. 61-92091

[51] Int. Cl.$^4$ ....................... G01B 11/00; G06F 15/46
[52] U.S. Cl. ..................................... 364/560; 250/561; 356/363; 358/107; 364/516; 364/525; 382/23
[58] Field of Search ............... 364/516, 559, 560, 525, 364/513, 518; 358/107, 903, 138; 356/138, 363; 250/561; 382/23, 27; 377/30, 39

[56] References Cited

U.S. PATENT DOCUMENTS

| | | | |
|---|---|---|---|
| 4,146,926 | 3/1979 | Clerget et al. ...................... | 364/525 |
| 4,402,053 | 8/1983 | Kelley et al. ....................... | 364/513 |
| 4,606,065 | 8/1986 | Beg et al. ............................ | 382/23 |
| 4,611,292 | 9/1986 | Ninomiya et al. ................. | 364/559 |
| 4,649,504 | 3/1987 | Krouglicof et al. ................ | 364/559 |
| 4,672,562 | 6/1987 | Egli et al. ........................... | 364/559 |
| 4,724,543 | 2/1988 | Klevecz et al. .................... | 382/27 |
| 4,727,471 | 2/1988 | Driels et al. ........................ | 364/559 |
| 4,737,921 | 4/1988 | Goldwasser et al. .............. | 364/518 |
| 4,743,965 | 5/1988 | Yamada et al. .................... | 358/138 |

FOREIGN PATENT DOCUMENTS 60-10564 3/1985 Japan .

OTHER PUBLICATIONS

German Workshop on A.I.; (1981); "Frame to Frame Correspondence Between Grayvalue Characteristics in the Images of Moving Objects"; Drieschler et al.; pp. 18–29.
"Cooperative Computation of Stereo Disparity"; Science; Oct. 1976 (V194, 15); D. Marr et al.; pp. 283–287.
"Study of Image in the U.S.A."; Data Processing; Dec. 1983 (v24, No. 12); pp. 1446–1452.

Primary Examiner—Parshotam S. Lall
Assistant Examiner—Kevin J. Teska
Attorney, Agent, or Firm—Antonelli, Terry & Wands

[57] ABSTRACT

Points on a pair of images obtained by imaging an object are finely corresponded in order to precisely measure the three-dimensional position of the object. For this purpose, attractive forces corresponding to features of the images are calculated, and the degree of correspondence between the points on the pair of images is evaluated relying upon the magnitude of the attractive force, in order to determine the corresponding points and to calculate the position of the object relying upon the thus determined corresponding points. Further, an occluded region which contains no corresponding point is detected and is removed, in order to further improve the precision for measuring the position.

8 Claims, 8 Drawing Sheets

IMAGE BY LEFT EYE

IMAGE BY RIGHT EYE

POSITION MEASURING METHOD

BACKGROUND OF THE INVENTION

The present invention relates to a position measuring apparatus, and particularly to a method of measuring the position or the distance of an object using a pair of image data obtained from the same object at difference positions or at different moments. The apparatus of this type is indispensable for a variety of equipment (such as robot having a sense of sight, automatic controller of a vehicle which responds to the external scenery, a process controller that works being interlocked to an ITV, and the like) which control devices relying upon image data.

In the position measuring apparatus of the above-mentioned type, it is necessary to determine by the automatic processing a point of one image which corresponds to a point of the other image. A conventional method for this purpose can be represented by "Cooperative Computation of Stereo Disparity" by D. Marr, T. Poggio, disclosed in "Science", Vol. 194,15, October, 1976, pp. 283–287. Another conventional method is represented by "Method of Forming Depth Data Signals for Three-Dimensional Televisions" disclosed in Japanese Patent Publication No. 10564/1985.

The above first conventional method permits the operations to be performed concurrently, and is adapted to high-speed processing. According to this method, however, the correspondence is not so fine since corresponding relationships are found among the pixels for the image consisting of pixels that are quantized into two levels. That is, a pixel of an image cannot be corresponded to an intermediate position between a pixel and a pixel of another image. This makes it difficult to calculate a position maintaining high precision. Further, since it is allowed to treat only those images that are quantized into two levels, the pixels are erroneously corresponded, and therefore develop many points which greatly deviated from the calculated positions.

The above second conventional method is also adapted to high-speed processing, in which two image signals are compared, and depth data of an object is obtained from the deviation between the pixels at a time when signal waveforms are nearly brought into agreement. In comparing the signal waveforms, however, one image that is being shifted is compared with another image. Therefore, the position is found even for a pixel of an object that has been projected upon one image only. In fact, however, the distance cannot be found for a portion (occluded region) that has been projected on one image only. In order to obtain position data maintaining high precision, therefore, it is necessary to correctly detect the occluded region and to remove it.

SUMMARY OF THE INVENTION

A first object of the present invention is to improve the precision for position measurement, by precisely corresponding the points between a pair of images.

A second object of the present invention is to improve the precision for position measurement, by detecting the occluded regions at the time of effecting the above-mentioned corresponding operation and by removing incorrect correspondence.

In order to achieve the above-mentioned first object, the present invention calculates an attractive force that corresponds to features (brightness, change of brightness of neighboring points, etc.) of a pair of images.

For each point, there usually exist a plurality of corresponding points at which a large attractive force can be exhibited. Among these corresponding points, there exists only one point that correctly corresponds. The invention makes use of the below-mentioned nature. That is, the depth usually changes smoothly on the surface of an object, and discrete change takes place only at boundary lines of the object. In order to utilize this nature, a network is considered to connect the points of one image to the points of another image.

Attractive forces are calculated among the corresponding points on the two images at the nodes (connection points) on the network, and corresponding points are determined from the distribution of evaluated values of the attractive forces. In order to find the distribution of attractive forces, a coefficient is introduced to evaluate the attractive forces, and the degree of correspondence is evaluated relying upon the product of the coefficient and the attractive force. A steady-state solution is found by adjusting values of coefficient at the nodes on the network using the evaluated degree of correspondence of nodes in the vicinities of the above nodes. In this case, the evaluated values of attractive forces at the nodes represent the degrees of correspondence among points on the image corresponding to the nodes.

Usually, deviation is very small among the corresponding points between the two images that are to be processed, and the number of points (number of nodes on the network) connected to points on the images is not so great. This fact makes it possible to put the automatic processing into practical use by employing the above-mentioned network.

In order to achieve the above-mentioned second object, the present invention finds corresponding points of the other image (referred to as B) for all of the points of one image (referred to as A) and, conversely, finds corresponding points of the image A for all of the points of the image B. Thereafter, the invention detects portions where pairs of corresponding points are not in agreement, that are obtained in the respective processings. These portions are occluded regions. Measurement of positions excluding these portions contains erroneous correspondence in reduced amounts.

In order to obtain a position data from a pair of image data, it is essential that the object from which the position data is to be obtained is projected onto both images. Corresponding points of a point projected onto both images form the same pair irrespective of from whichever one of them it is found. As for a point that is projected onto one image, however, there exists no similar point in the other image. When it is attempted to find a corresponding point from the other image, therefore, there is obtained no pair that corresponds to such a point. By finding corresponding points from both of the pair of images, as described above, it is possible to remove erroneous correspondence for the occluded region.

DETAILED DESCRIPTION OF THE PREFERRED EMBODIMENTS

Figure 1:
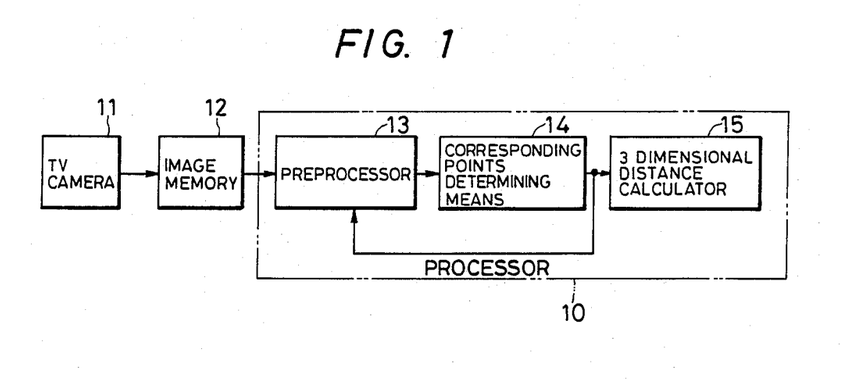
FIG. 1 is a block diagram which illustrates a first embodiment of the present invention.

FIG. 1 is a block diagram of a position measuring apparatus according to a first embodiment of the present invention. Data that represent image picked up by a TV camera 11 are stored in an image memory 12. In the case of the three-dimensional view by both eyes, two images picked up simultaneously from different positions will be stored. When there is a relative movement between a measuring system and an object being measured, however, there may be stored two images that are picked up at different times. A processor 10, in this case, is comprised of a preprocessor 13, a corresponding point determining means 14, and a distance calculator 15. The preprocessor 13 reads image data from the image memory 12, calculates mean brightness and change of brightness of neighboring points for each region of a suitably small size, and sends the results to the corresponding point determining means 14 which calculates corresponding relationships among the small regions relying upon the data that is received and sends an instruction to the preprocessor 13 based upon the calculated result. In response thereto, the preprocessor 13 changes the size of the regions, executes the preprocessing and sets an initial value for calculation. The above processing is repeated a suitable number of times, and the calculated result of the corresponding relationships is sufficiently converged. The thus converged calculated result is then sent to the three-dimensional distance calculator 15 which calculates the positions.

Figure 2:
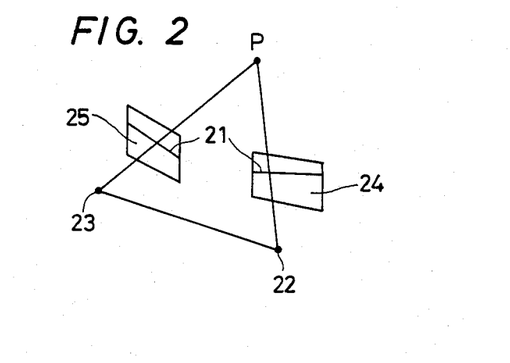
FIG. 2 is a diagram explaining an epipolar line of when an image is looked at by both eyes.

The above-mentioned processing at each of the portions will now be described in detail with reference to the case of the three-dimensional view with both eyes. In the case of the three-dimensional view with both eyes, two TV cameras 11 corresponding to the right and left eyes are provided at known positions. In this case, the operation for searching the corresponding points can be limited onto the epipolar line. Here, as shown in FIG. 2, the epipolar line is a line 21 of intersection of images 24, 25 of the cameras with a plane determined by three points, i.e., determined by a lens center 22 of the right camera, lens center 23 of the left camera, and an object point P (see "Study of Image in the U.S.A.", Data Processing, Vol. 24, No. 12, p. 1449). The image data is stored in the image memory 12 being so modified that the epipolar line is brought into agreement with the corresponding scanning lines of the two images. With the data being stored in such a form, all that is needed is to examine the corresponding relationships between points on the corresponding scanning lines of the two images.

Figure 3:
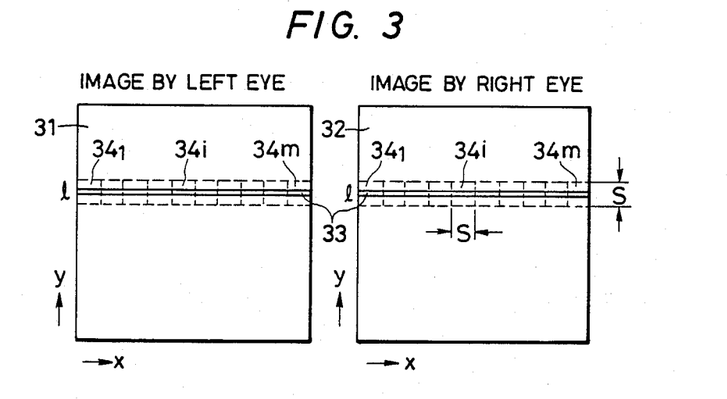
FIG. 3 is a schematic diagram of an image for explaining the preprocessing when the image is looked at by both eyes.

Described below is the processing by the preprocessor 13. In FIG. 3, reference numeral 31 denotes an image by the left eye, 32 denotes an image by the right eye, and 33 denotes a scanning line that serves as an object for determining the corresponding points and that is in agreement with the epipolar line. The preprocessor 13 takes up small regions $34i$ ($i=1, 2, \ldots m$) of $n \times n$ pixels inclusive of the scanning line 33, and calculates the mean brightness of the small regions in accordance with the following equation, $$AR(i) = \left\{ \sum_{y=l-\frac{n}{2}+1}^{l+\frac{n}{2}} \sum_{x=(i-1)n}^{in-1} RI(x,y) \right\} / n^2 \quad (1)$$

$$AL(i) = \left\{ \sum_{y=l-\frac{n}{2}+1}^{l+\frac{n}{2}} \sum_{x=(i-1)n}^{in-1} LI(x,y) \right\} / n^2$$

where n denotes the number of pixels of one side of the small region, RI (x, y) and LI (x, y) denote quantities of brightness possessed by pixels of the right eye image and left eye image at a position (x, y), l dentoes a scanning line number with which the corresponding points are to be determined and the three-dimensional distance is to be found, and m denotes the number of small regions.

Using the thus found brightness of the small regions, the change of brightness (differential value) will now be calculated in compliance with the following equation, $$BR(i) = \sum_{j=i-d}^{i+d} AR(j) \cdot \frac{j-i}{\sigma_1^2} \cdot \exp\left( -\frac{(j-i)^2}{2\sigma_1^2} \right) \quad (2)$$

$$BL(i) = \sum_{j=i-d}^{i+d} AL(j) \cdot \frac{j-i}{\sigma_1^2} \cdot \exp\left( -\frac{(j-i)^2}{2\sigma_1^2} \right)$$

where d denotes a constant that represents the width of a proximity that is to be differentiated, and $\sigma_1$ denotes a parameter for effecting the differentiation and smoothing simultaneously.

Figure 4:
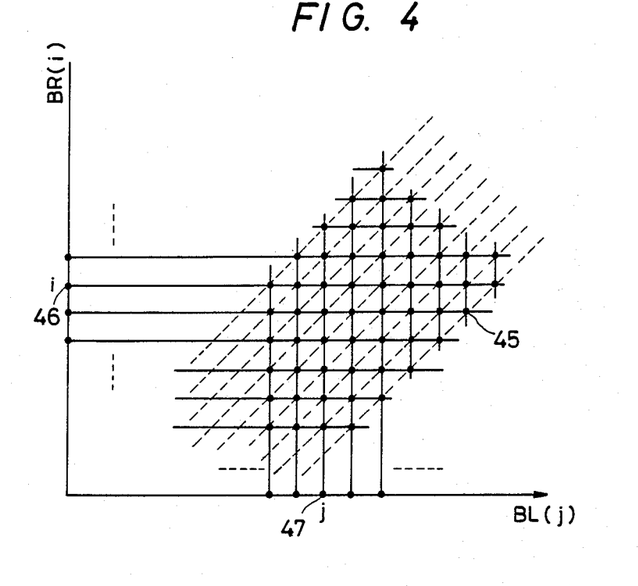
FIG. 4 is a diagram of a network for determining corresponding points on the corresponding scanning lines.

The foregoing describes the contents of the process performed by the preprocessor 13. The corresponding point determining means 14 will now be described. The corresponding point determining means 14 presumes a network that is shown in FIG. 4, and calculates the attractive forces at each of the nodes on the network. FIG. 4 shows a network in which differential values BR (i) for the right eye image are indicated by points 46 in the direction of ordinate, differential values BL (j) for the left eye image are indicated by points 47 in the direction of abscissa, and nodes are connected from the points of one image to the points of the other image. Points on the image to be connected to the points i can, in practice, be limited to the opposing points and to a suitable number of proximity points. FIG. 4 illustrates only nine points.

The corresponding point determining means 14 performs the calculations of the following calculation procedures (II) and (III) several times for the network, and determines the corresponding points when the steady-state solution is nearly reached; i.e., (I) Set initial values of coefficient R (i, j) of attractive forces for each of the nodes.

(II) Calculate the corresponding degree X (i, j) for each of the nodes in accordance with the following equation, $$X(i,j) = R(i,j) \cdot \exp\left[-\frac{\{BR(i) - BL(j)\}^2}{2\sigma_2^2}\right] \quad (3)$$

where $\sigma_2$ denotes a parameter for determining the magnitude of the attractive force.

Figure 5:
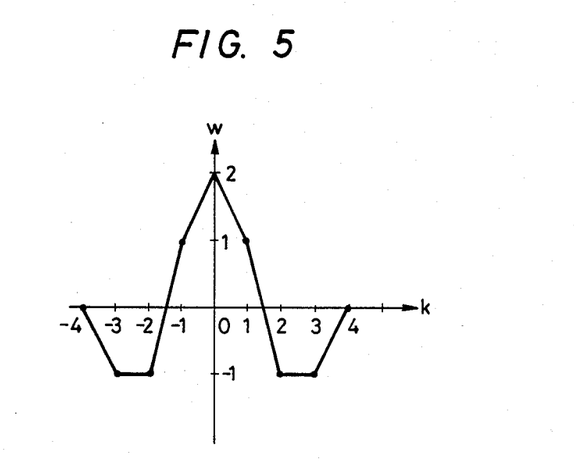
FIG. 5 is a graph of weight coefficients used for updating the coefficient of the attractive force.

(III) Update the coefficient R (i, J) of attractive force for each of the nodes according to the following equation, $$R'(i,j) = R(i,j) + \beta \cdot \Delta R(i,j) \quad (4)$$

where, $$\Delta R(i,j) = \sum_{k=-1}^{1} \{\Delta Rx(i + k,j) + \Delta Ry(i + k,j)\} \quad (5)$$

$$\Delta Rx(i,j) = \sum_{k=-l}^{l} w(k) \cdot X(i,j + k) \quad (6)$$

$$\Delta Ry(i,j) = \sum_{k=-l}^{l} w(k) \cdot X(i + k,j) \quad (7)$$

wherein w denotes a weight coefficient for the evaluated value X of attractive force and represents a value of function shown in FIG. 5, $\beta$ denotes a suitable correction coefficient, and l denotes a constant that indicates the width for weighting (e.g., l=4 in FIG. 5).

When the steady solution is obtained as described above, the corresponding points are found in accordance with the following equations, $$\begin{cases} p_i = \sum_{j=jm-a}^{jm+a} (j - jm) \cdot X(i,j) / \sum_{j=jm-a}^{jm+a} X(i,j) + jm & (8) \\ jm\{j; \max_{j} X(i,j), j = i, i + 1, \ldots, i + s\} & (9) \end{cases}$$

where
$p_i$: small region number of the left eye image corresponding to an i-th small region of the right eye image, and
a: constant that indicates the width for finding corresponding points.

The equations (8) and (9) indicate that the greatest evaluation value of attraction is selected from the node connected to the i-th small region of the right eye image, and the evaluation values of attractive forces of nodes that lie within a width of ±a with the abovesaid node as a center, are added up and averaged with the distance among the nodes as weight. When the small region $p_i$ contains a decimal part, it is interpreted that the decimal part represents a point between the small region and the next small region.

Figure 6:
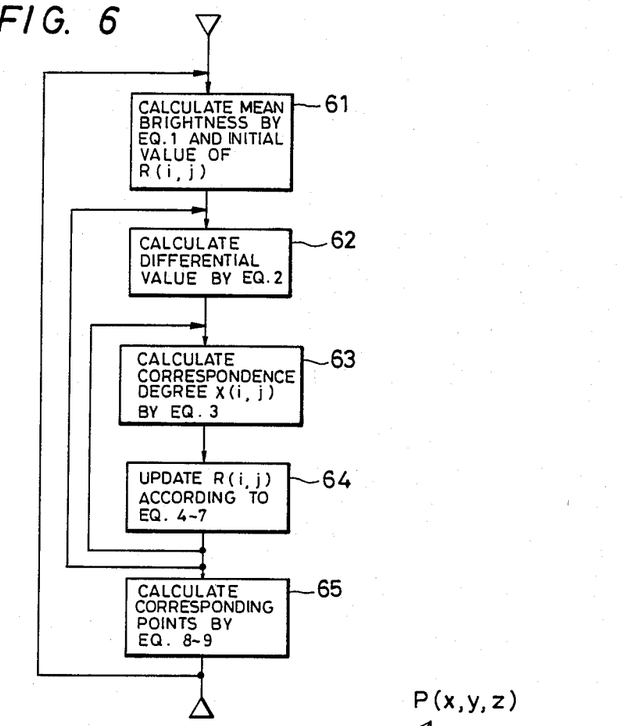
FIG. 6 is a flow chart for explaining the processing procedure according to the present invention.

Next, the procedure of calculations will be described in detail using a flow chart of FIG. 6. First, a step 61 finds an average brightness of the small regions in compliance with the equation (1), and sets an initial value R (i, j). At the time of starting the calculation R (i, j) should be set to a suitable value of, for example, about 5.0. Using the average brightness of the small regions, a next step 62 calculates a differential value in compliance with the equation (2). Using the differential value, a step 63 and a step 64 repeats the calculation X (i, j) in compliance with the equation (3) and the calculation R (i, j) in compliance with the equations (4) to (7) several times. The parameter $\sigma_2$ of the equation (3) is gradually reduced while repeating the calculation, and the correspondence is made fine gradually. After the steps 63 and 64 are repeated several times, the process returns to the step 62 which performs the calculation in accordance with the equation (2) with a decreased parameter $\sigma_1$ to make the differential value fine. Then, the steps 63 and 64 repeat the calculations. After these calculations have been finished, a step calculates the corresponding points, and the process returns to the step 61. The step reduces the size n of the region for finding the average brightness, and performs the calculation in compliance with the equation (1) and then sets the initial value R (i, j) in compliance with the following equation based upon the result of calculating the corresponding points of the step 65, $$R(i,j) = 10.0 - \{j - (i + p'_i)\}^2 \quad (10)$$

where R (i, j)=0.0 when R (i, j)<0.0, and $p_i'$ denotes the amount of deviation of a point of the left eye image to which is corresponded a point i of the right eye image on a new network as found from the result of the step 65.

Calculations of the steps 62 to 65 are repeated using the initial value of the equation (10).

The above-mentioned calculations are repeated while gradually decreasing the size n of the small region from which the mean brightness is to be found, thereby to finally find the corresponding points.

In the foregoing was mentioned the processing procedure by the corresponding point determining means 14. Here, the equations (4) to (7) have meanings as described below. In an environment in which a moving member undergoes the movement, in general, it is considered that the surface of the object changes smoothly on most of the places (hereinafter referred to as continuity assumption), and the distance changes little among the neighboring pixels. As the equations (4) to (7) indicate, if there is a node having a large evaluation value of attractive force, the continuity assumption is satisfied by so updating the coefficient R (i, j) of attractive force using the weighting w that it increases toward the nodes in the proximity of the above node and that it decreases as it separates away from the above node, and further effecting the updating using the abovesaid weighting (i.e., weighting that becomes a maximum at i±1) even for the node connected to a point (i±1) in the proximity of i.

Figure 7:
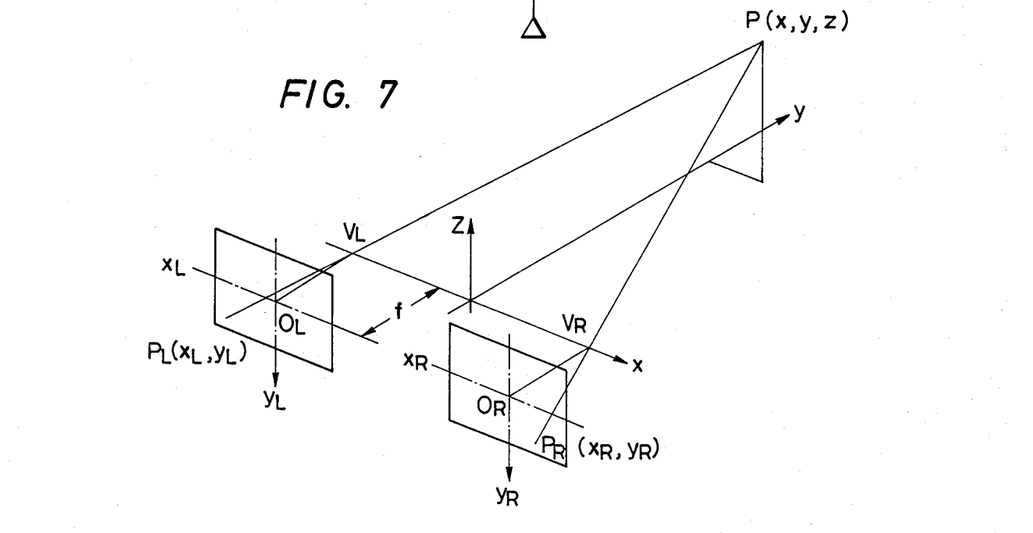
FIG. 7 is a schematic diagram showing a relationship between positions of corresponding points on the image and positions of the points to be measured.

The distance calculator 15 will now be described in conjunction with FIG. 7, wherein $V_L$ and $V_R$ denote center coordinates of optical systems of the left and right cameras. $P_L$ ($x_L$, $y_L$) and $P_R$ ($x_R$, $y_R$) denote positions of an image formed on the image planes of the left and right cameras by a point P (x, y, z) on the surface of an object located in front, and f denotes a focal distance of the lens. In this case, as is well konw, the position of the point P is given by, $$\begin{cases} x = \dfrac{x_L V_R - x_R V_L}{x_L - x_R} \\ y = f\dfrac{-V_L + V_R}{x_L - x_R} \\ z = \dfrac{y_L(-V_L + V_R)}{x_L - x_R} \end{cases} \quad (11)$$

Based upon $(x_R, y_R)$, $(x_L, y_L)$ at each of the points calculated by the corresponding point determining means 14 and the equation (11), the distance calculator 15 calculates three-dimensional distances of each of the points on the object that correspond to the points on the images.

Figure 8A:
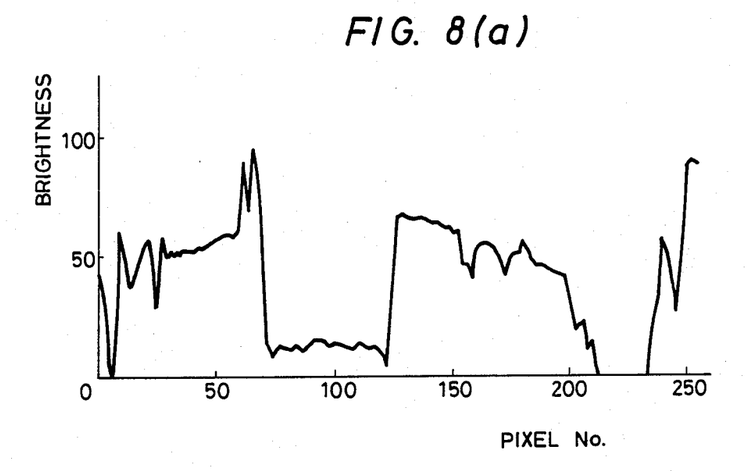
FIGS. 8a 8b, 9a and 9b are graphs showing the results of processing according to the present invention.
Figure 8B:
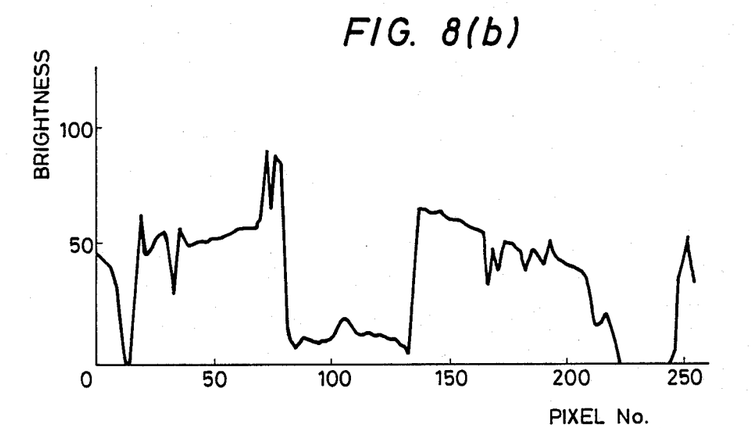
Figure 9A:
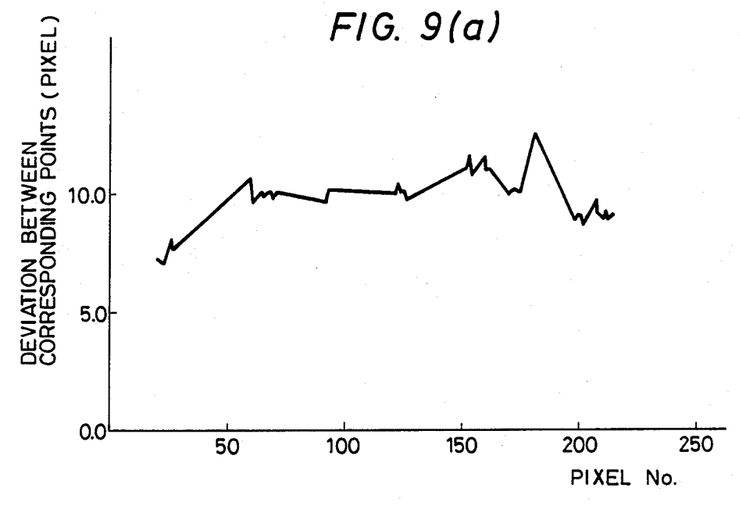
Figure 9B:
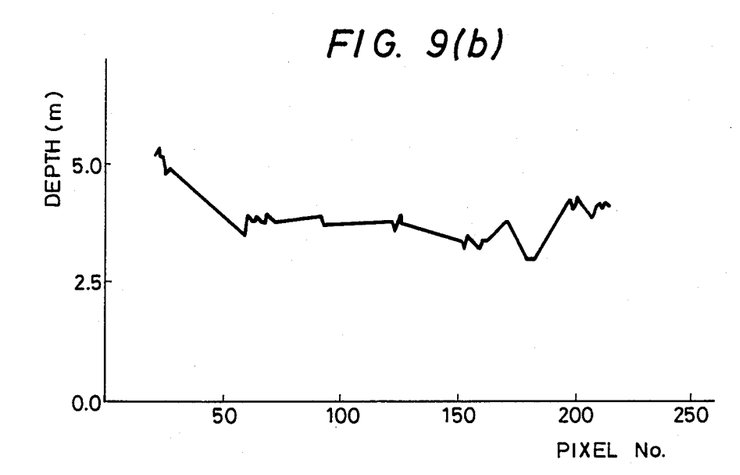

The results of processing obtained according to this embodiment are shown in FIGS. 8 and 9. FIGS. 8(a) and 8(b) are a right eye image and a left eye image on a pair of corresponding scanning lines stored in the image memory 12, wherein the abscissa represents a pixel number and the ordinate represents the brightness. In response to the image data, the preprocessor 13 calculates mean brightness and a differential value for each small region consisting of 2×2 pixels, and the corresponding point determining means 14 calculates the corresponding points. Then, using this result, an initial coefficient value R (i, j) for calculating attractive force is determined, and the calculations are carried out using mean brightness of each of the small regions of 1×1 pixel. The results finally obtained by the corresponding point determining means 14 are shown in FIG. 9(a), wherein the abscissa represents the pixel number and the ordinate represents the number of pixels by which the left eye image is deviated with respect to the right eye image. Here, the calculated results are directly indicated only for those pixels having large absolute differential values, and the points are interpolated for other pixels. FIG. 9(b) shows the distance (depth) in the direction y calculated by the three-dimensional distance calculator 15 based upon FIG. 7.

In the foregoing was described the embodiment in which the object was looked at by both eyes. The invention, however, is not limited to the case only where the corresponding points are found on the corresponding scanning lines only but can also be adapted to the case where the corresponding points are to be found over a two-dimensional region such as images obtained by imaging an object at different moments, the object undergoing a relative displacement in a given direction.

Described below is an embodiment which detects a occluded region to measure the position.

Figure 10:
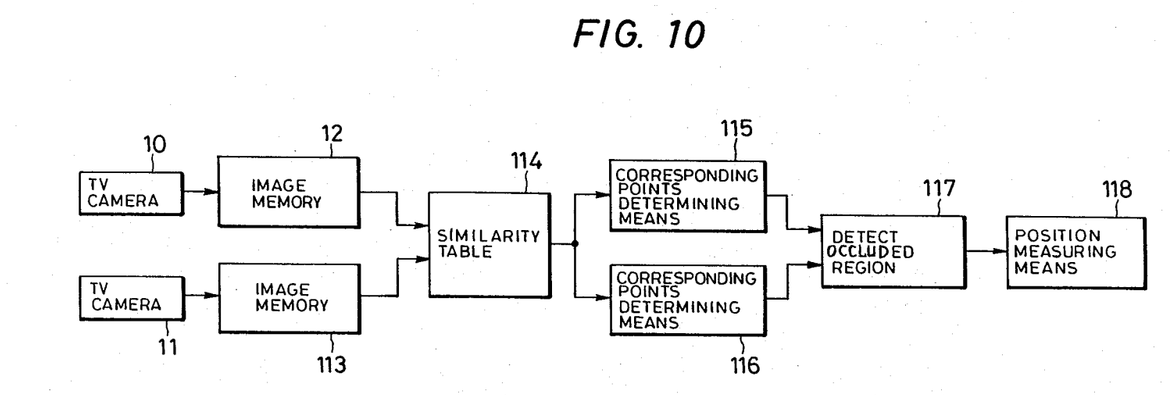
FIG. 10 is a block diagram showing a second embodiment of the present invention.

FIG. 10 is a block diagram of a position measuring apparatus according to a second embodiment of the present invention. Data representing a pair of images picked up by TV cameras 10 and 11 are once stored in image memories 12 and 113. In the case of the three-dimensional view by both eyes, two images simultaneously picked up at different positions are stored. When the TV camera undergoes the movement, however, only one TV camera may be used, and two images picked up at different moments may be stored in the image memories 12 and 113. A similarity table 114 stores similarities among the points found by using the image data of the image memories 12 and 113. Corresponding point determining means 115 and 116 read data of similarities from the similarity table 114, and calculate corresponding points between one image and the other image. The corresponding point determining means 115 calculates points that correspond to points of the image of the image memory 12, and the corresponding point determining means 116 calculates points that correspond to points of the image of the image memory 113. The calculated results are sent to a occluded region pick-up means 117 which examines whether the pairs of the corresponding points are in agreement or not, and picks up the points that are not in agreement as a occluded region. A position measuring means calculates the positions of the points excluding the occluded region relying upon the amount of deviation of the corresponding points.

The processing in each of the above-mentioned portions will now be described in detail with reference to the case of three-dimensional view by both eyes. In the case of the three-dimensional view by both eyes, the corresponding points can be searched within the corresponding scanning lines of the two images as has been disclosed in U.S. patent application Ser. No. 723,141 filed Apr. 15, 1985 now abandoned. Here, the images stored in the image memories 12 and 113 are presumed to be those that are picked up by the TV cameras 10 and 11, and are thus converted. The following description deals with the processing for a pair of scanning lines of such images.

Figure 11:
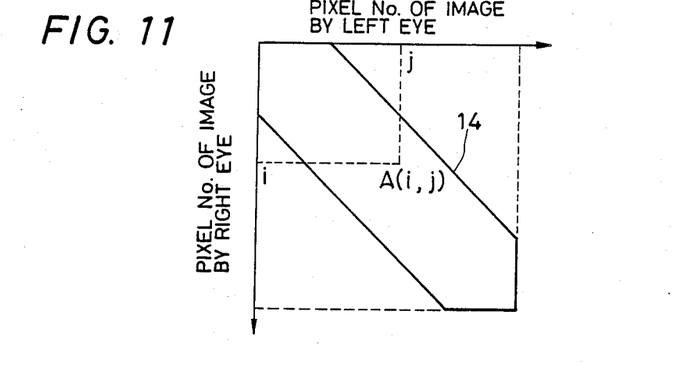
FIG. 11 is a diagram which explains a similarity table of pixels of a right eye image and a left eye image.

The similarity table 114 stores similarities found by using the image data of the right eye image and the image data of the left eye image. That is, as shown in FIG. 11, at a point A (i, j) is stored a similarity of an i-th pixel of the right eye image and a j-th pixel of the left eye image. The width of the table should be suitably determined depending upon a range for measuring the positions. For example, when the deviation between the right eye image and the left eye image is within k pixels, the value of table should be found within a range of $i-k \leq j \leq i+k$.

The similarity is found in accordance with the following equation, $$A(i, j) = |R(i) - L(j)| \quad (12)$$

or $$A(i, j) = \{R(i) - L(j)\}^2 \quad (13)$$

using brightness values R (i) and L (j) at the points of the right eye image and the left eye image. Furthermore, the similarity may be found in accordance with the equation, $$A(i, j) = |DR(i) - DL(j)| \quad (14)$$

or $$A(i, j) = |DR(i) - DL(j)|^2 \quad (15)$$

using the change quantities DR (i) and DR (j) of brightness at the points of the right eye image and left eye image.

Figure 12:
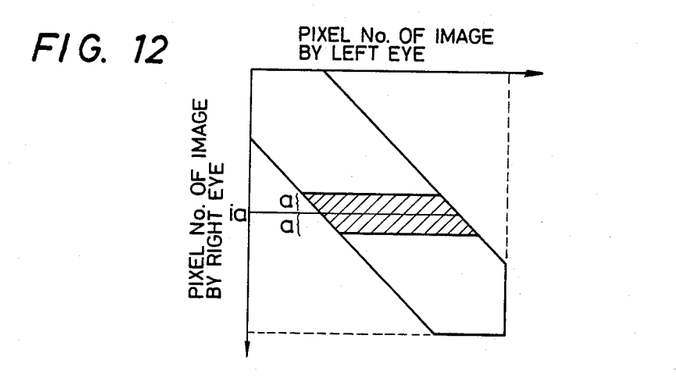
FIG. 12 is a diagram which explains a method of finding corresponding points of the right eye image when the object is looked at by both eyes.

The corresponding point determining means 115 and 116 perform the processing as described below to find corresponding points. First, the corresponding point determining means 115 sets a small region of a suitable width with a point (pixel) of the left eye image as a center as represented by a hatched area in FIG. 12, to find, $$ARia(d) = \sum_{i=ia-a}^{ia+a} A(i, i + d) \text{(for } d = -k \sim k) \quad (16)$$

In the equation (16), if a value d that makes ARia (d) a maximum is denoted by da, then da represents a deviation amount of the left eye image from the ia-th pixel of the right eye image. That is, the ia-th pixel of the right eye image and the (ia+da)th pixel of the left eye image form a pair of corresponding points. This processing is effected for all pixels of the right eye image to find corresponding points between the right eye image and the left eye image. Next, the corresponding point determining means 116 sets a small region of a suitable width with a point (pixel) of the left eye image as a center as represented by a hatched area in FIG. 13, to find, $$ALja(d) = \sum_{j=ja-a}^{ja+a} A(j + d, j) \text{(for } d = -k \sim k) \quad (17)$$

Figure 13:
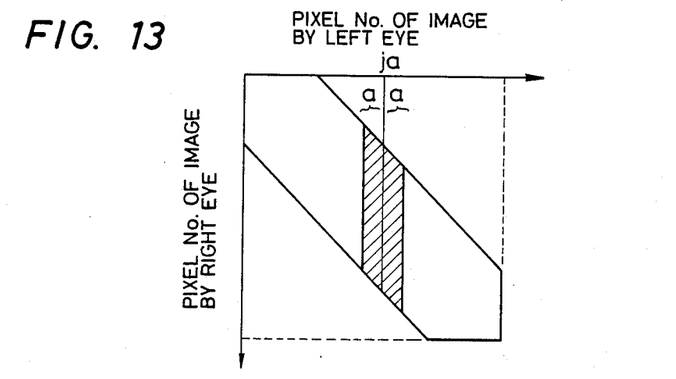
FIG. 13 is a diagram which explains a method of finding corresponding points of the left eye image when the object is looked at by both eyes.

In the equation (17), if a value d that makes ALja (d) a maximum is denoted by da, then da represents a deviation amount of the right eye image from the ja-th pixel of the left eye image. That is, the ja-th pixel of the left eye image and the (ja+da)th pixel of the right eye image form a pair of corresponding points.

Figure 14A:
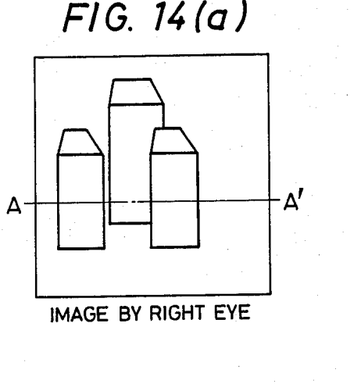
FIGS. 14a–e are diagrams showing results obtained by putting the invention into practical use.
Figure 14B:
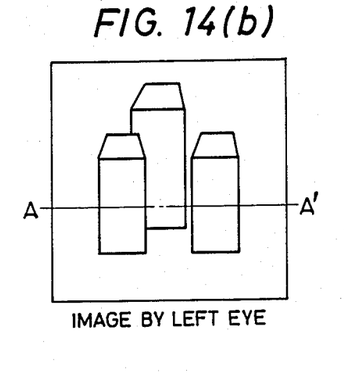
Figure 14C:
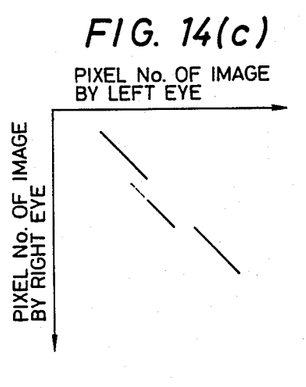
Figure 14D:
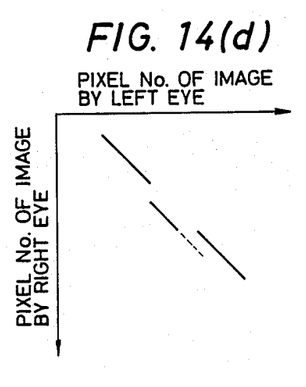
Figure 14E:
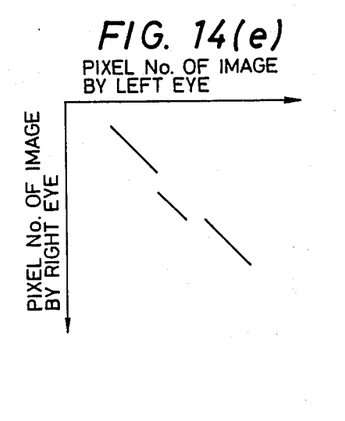

The occluded region pick-up means 117 picks up a occluded region using the results of the corresponding point determining means 115 and 116. The procedure for this operation will now be described with reference to FIG. 14. FIGS. 14(a) and 14(b) illustrate right eye image and left eye image, and wherein A-A' represents a pair of scanning lines for finding the corresponding points. It is now presumed that FIG. 14(c) shows the points of the left eye image to which the points of the right eye image are corresponded as found by the corresponding point determining means 115, and FIG. 14(d) shows the points of the right eye image to which the points of the left eye image are corresponded as found by the corresponding point determining means 116. The occluded region pick-up means 117 finds common portions of corresponding points of FIGS. 14(c) and 14(d), removes corresponding points in the occluded regions, and obtains corresponding points as shown in FIG. 14(e). Concretely speaking, corresponding points of pixels of the right eye image are successively taken out. When, for example, a point to which an ia-th pixel of the right eye image corresponds, is a ja-th pixel of the left eye image, it should be examined whether a point to which the ja-th pixel of the left eye image corresponds is in agreement with the pixel number ia of the right eye image. When they are not in agreement, the corresponding points are those of the occluded region and should be removed from the pairs of corresponding points.

The position measuring means 118 calculates the position of the object relying upon the corresponding point pairs from which the corresponding points of occluded regions have been removed by the occluded region pick-up means 117. The position of the object is calculated relying upon the coordinates of the corresponding point pairs in the right eye image and the left eye image, center coordinates of optical systems of the TV cameras, and the focal distance of the lens (see U.S. Ser. No. 723,141 mentioned earlier).

The foregoing description has dealt with embodiments of when an object was looked at by both eyes. The present invention is not limited to only the case where the corresponding points are to be found on the corresponding scanning lines such as when an object is looked at by both eyes, but can also be adapted to the case where the corresponding points are to be found over a two-dimensional range such as when an object is imaged at different moments, the object undergoing relative displacement in a given direction.

According to the present invention as described above, dense and pale data of image can be directly used (without digitizing them into binary values) to determine the corresponding points. Furthermore, it is allowed not only to correspond one pixel to another pixel, but also be correspond a pixel of one image to a position between the pixels of the other image, contributing to increasing the precision for measuring the position or the distance.

According to the present invention, furthermore, it is easy to pick up a portion (occluded region) of an outer world projected upon only one of the pair of images. That is, the position is measured with the above portion being removed, and the measurement of position features improved reliability.

What is claimed is:

1. A position measuring method comprising the steps of:
   inputting a pair of image data representing an image of a picture of an external world;
   processing the input image data to calculate a distribution of attractive forces generated between features of points of one image and features of points of an other image;
   determining pairs of corresponding points on the images based upon said distribution; and
   calculating positions of points of the external world corresponding to said corresponding points based upon relationships between positions of the pairs of the corresponding points.

2. A position measuring method according to claim 1, wherein a feature at each of the points of the images is brightness.

3. A position measuring method according to claim 1, wherein a feature at each of the points of the images is a changing quantity of brightness at a point in proximity to each of the points.

4. A position measuring method comprising the steps of:
   inputting a pair of image data representing an image of a picture of an external world;
   processing the input image data to find corresponding points of one image from the points of another image that form pairs of corresponding points;
   determining pairs of corresponding points of a pair of first and second images by picking up only those corresponding points that lie within a predetermined number of pixels that are in agreement with the pairs of corresponding points found in the processing step; and
   calculating a position of a point of an external world corresponding to said corresponding points based upon a relationship of positions between the pairs of the corresponding points.

5. A position measuring method according to claim 4, wherein said processing step is performed by finding a point on the second image that forms a pair relative to a predetermined point on the first image, or by finding a corresponding point on the first image for a predetermined point on the second image when there are a plurality of corresponding points.

6. A position measuring method according to claim 4, wherein said predetermined point is a feature point in each of the images.

7. A position measuring method according to claim 6, wherein the feature point in each of the images is selected depending upon the magnitude of change of an brightness of image in proximity to the corresponding points.

8. A position measuring method according to claim 4, wherein said corresponding points are determined based upon similarities of small regions set on the first image and small regions set on the second image.

* * * * *